United States Patent Office 3,069,307
Patented Dec. 18, 1962

3,069,307
OXYALKYLATED PHENOL PROCESS
William M. Boaz, Kirkwood, and Kenneth J. Lissant, St. Louis, Mo., assignors to Petrolite Corporation, Wilmington, Del., a corporation of Delaware
No Drawing. Filed Apr. 20, 1960, Ser. No. 23,389
4 Claims. (Cl. 162—5)

This invention relates to a process of deinking paper characterized by treating imprinted paper products with an aqueous solution containing a minor amount of an oxyalkylated aromatic phenol compound.

Since paper manufacture does not damage or alter the character of the essential fiber from which the paper is originally made, such fiber may be recovered from used paper and reused, time after time, in the manufacture of fresh paper stock. The limitations in respect to the practical recovery of fiber from used paper are to be found in the difficulty and expense of thoroughly deinking printed paper stock to upgrade it to the color and quality of the original paper stock. Therefore, cost is essential in deinking and a process which cannot deink economically has no commercial value.

Many processes have been used for deinking paper so as to make the fibers thereof reuseable. These processes, however, are generally expensive, laborius, time-consuming, and/or complicated. Most of these processes are commercially unsatisfactory because: (1) they are too costly; (2) they produce a pulp which is not of a sufficient brightness and cleanliness, or (3) they require unusual and expensive equipment for their practice. Many processes are costly because of the type and large quantities of chemicals needed. They often fail to initially free enough ink so as to result in imparting irreversible coloration to the fibers, leave carbon agglomerates therein, or darken the paper because of the heat and/or chemical employed, all or each of which reduces the brightness of the recovered pulp.

In general, in preparing used paper for deinking and recovery of fiber, the stock to be salvaged is first thoroughly cleansed of superficial dirt and macerated by means of any suitable system or apparatus. Then the maceratum is boiled, subjected to the cooking and defibering in a suitable aqueous alkali to soften the paper fibers, loosen and disintegrate at least part of the ink and other matter adhering to the fibers, and thoroughly agitated, either while in the alkaline solution or subsequently, to disintegrate and defiber the stock as thoroughly as possible. Thereafter, the pulp is riffled and screened and subsequently dewatered, preferably through suitable rolls, filter, or the like, to remove a considerable portion of the loosened ink. It is then washed and dewatered for removal of additional quantities of the loosened ink as many times as may be practical and expedient.

Thus, all commercially successful processes for deinking waste paper involve the following steps:

(1) Dusting and maceration.
(2) Alkali cooking and defibering.
(3) Riffling and screening.
(4) Washing.

In general, the sorted, dusted and macerated paper is cooked with an aqueous deinking agent at a temperature of from 140° F. to its boiling point for 2.5–48 hours at concentrations of 4–25% by weight of paper in the alkali solution. Heat consumption will vary inversely with the concentration and viscosity of the stock. Defibering is generally accomplished during the cooking operation.

In general, the deinking agent employed contains an aqueous alkali solution which may in addition contain one or more of the following: a detergent, for example sodium soaps of fatty acids or abietic acid, sulfonated oil, etc.; a dispersing agent to prevent agglomeration of the pigment after release and to emulsify any unsaponifiable material; a softening agent such as kerosene or mineral oil, etc. to soften the vehicle of the inks; an agent such as clay, a silicate, etc., for selective adsorption after release from the fiber to prevent redeposition on the fiber; a basic exchange chemical to prevent formation of calcium soaps, etc.

The cooked and defibered pulp is then diluted to less than 1% concentration and riffled and screened to remove oversized objects and undefibered pieces of paper. This material is then washed with voluminous amounts of water, an average of 20,000 gallons of water per ton of pulp, to separate the fiber from other substances by washing or screening or by a flotation process. The disposal of large amounts of water used in the process poses a stream pollution problem which must be remedied in most areas of the country.

The problem of deinking has been further complicated by certain recent changes in the paper industry which have increased the difficulty of deinking, among which changes are the following:

(1) The increased use of groundwood containing small slivers of wood rubbed from pulp wood present jagged sawtooth ends which afford excellent crevices for trapping the carbon particles of the printer's ink, thus making it increasingly difficult to produce a reuseable pulp of high quality of whiteness. In addition groundwood tends to darken with the application of heat and/or base.

(2) Many of the improved new inks currently in use are non-saponifiable with caustic, and generally require more drastic cooking conditions during deinking, thus tending to further degrade the cellulosic fiber.

(3) Certain paper coatings such as casein and soybean proteins hardened with formaldehyde require for their removal higher temperatures which also degrade the fiber.

(4) The increased filler content of paper, now approaching an average of 25%, results in increased shrinkage during deinking which increases the cost of deinked stock.

Among the disadvantages of prior processes are the following:

(1) Long cooking periods at elevated temperatures require large expenditures of energy with increased expense.

(2) High temperatures and strong chemicals employed in these processes tend to deleteriously affect the fibers so that they are not always of the same quality as those from fresh paper pulp.

(3) The use of large amounts of caustic-containing water poses a stream pollution problem which requires expensive pollution control systems.

A statement of the deinking problems and proposed solutions thereof can be found, for example, in the following patents: 2,673,798, 2,607,678, 2,580,161, 2,219,-781, 2,112,562, 2,077,059, 2,005,742, 1,993,362, etc.

The desideratum of a deinking process is to be able (1) to pulp imprinted paper in the presence of an aqueous solution containing a minor amount of an inexpensive deinking agent at about room temperature so as to free the ink therefrom, (2) to remove the ink-containing solution from the pulp by a simple expedient, and (3) to recover a pulp which is commercially acceptable, preferably having substantially the same properties and brightness of the original paper. All of these should be performed in simple equipment and at low cost. It is also desirable to be able to employ a deinking solution that can be repeatedly recycled after being freed of carbon particles derived from the ink.

We have now discovered a process of deinking paper products which fulfills all of these requirements characterized by treating imprinted paper products with a deinking solution containing a minor amount of an oxyalkylated aromatic phenol compound, for example an oxyalkylated phenol. The process is carried out at about room temperature and in the absence of strong chemicals, such as caustic and the like, so that no degradation or darkening of the paper occurs. The cost of the oxyalkylated phenol is extremely low since it is itself inexpensive and is employed in very low volume concentrations, for example less than about 2%, such as 1%, for example .001 to 1%, but preferably 0.33 to 0.033%. Higher percentages can be employed such as 3–5% or more but without economic advantage. In fact, the economics of any deinking process is so important that the deinking agent must be very powerful one which is effective at extremely low concentrations in the system. Our deinking agent is so effective that in screening specific members of the class we select those that are effective deinkers at concentrations of 0.033 to 0.33%. In addition, upon removal of the ink from the pulp-freed solution, one should be able to recycle this solution in the process, for example 5 to 10 or 20 or more times, or substantially indefinitely, with additional "make-up" solution added to replace operational losses.

In general, the process is carried out by pulping imprinted paper with an aqueous solution containing minor amounts of an oxyalkylated phenol, and then removing the carbon particles from the paper pulp by any satisfactory means, for example, those means well known to the deinking art, such as by filtration, centrifugation, flotation, etc. Flotation is a very useful expedient since it simultaneously removes the carbon particles from the paper as well as the solvent so that the solvent can be recycled without further treatment. Where filtration is employed, the solvent which contains carbon particles from the printing ink is first filtered from the paper pulp by employing a coarse filter and then filtered from the solvent by employing a fine filter before recycling.

The deinking agents employed in this invention are oxyalkylated aromatic phenolic compounds such as oxyalkylated phenols, for example those represented by the formula Ⓐ—(OA)$_n$OH, but preferably

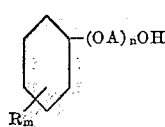

where Ⓐ is an aromatic radical, where R is a hydrocarbon group having for example 1–30 or more carbon atoms such as 4 to 20 carbon atoms, but preferably 6 to 14 carbon atoms; A is the radical derived from the alkylene oxide, for example, ethylene oxide, propylene oxide, butylene oxide, etc.; $m=0$–5, for example 1–3, but preferably 1–2, and $n$ is the number of moles of alkylene oxide added such as 1–200 or more, for example 4 to 150, but preferably 15 to 90. The optimum number of moles of alkylene oxide added will depend on the particular phenol employed as the starting material, the type or types of alkylene oxides added, the order of addition of the alkylene oxides, etc. However, we have found that to achieve the brightness desired in the deinked paper the oxyalkylated phenol should contain at least 40% by weight, for example 40–98%, and preferably 50–98, with an optimum of 70–90% of the alkylene oxide.

In certain cases, it is advantageous to react the phenol with alkylene oxides in a random fashion so as to form a random copolymer on the oxyalkylene chain, i.e. the (OR)$_n$OH chain could be AABAABBABABBBA. In addition, the alkylene oxides can be reacted in an alternate fashion to form block copolymers on the chain, for example

or

where A is the unit derived from one alkylene oxide, for example ethylene oxide, and B is the unit derived from a second alkylene oxide, for example propylene oxide, and C is the unit derived from a third alkylene oxide, for example, butylene oxide, etc. Thus, these compounds include bis- and ter-polymers, or higher copolymers polymerized randomly or in a blockwise fashion or in many variations of sequential additions.

Thus, —(OR)$_n$— in the above formula can be written —A$_a$B$_b$C$_c$— or any variation thereof, wherein $a$, $b$ and $c$ are zero or a number, provided at least one of them is greater than zero.

Thus, phenol itself can be oxyalkylated, as well as a hydrocarbon substituted such as an alkylated phenol containing 1–5 ring-attached alkyl groups such as methyl, ethyl, propyl, butyl, pentyl, hexyl, heptyl, octyl, nonyl, decyl, dodecyl, tridecyl, tetradecyl, pentadecyl, hexadecyl, heptadecyl, octadecyl, etc., including unsaturated analogues thereof such as pentadecenyl, etc., as well as cycloaliphatic groups such as cyclohexyl, and aromatic groups such as phenyl, etc. In addition, the alkyl group can contain other elements besides carbon and hydrogen, for example, oxygen such as in an alkoxy group, etc. The term "aromatic phenolic compound" also includes phenolic compounds having condensed ring structures, such as naphthyl radicals, i.e.

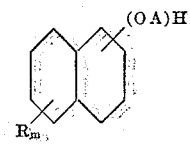

as well as those derived from bis-phenol-A

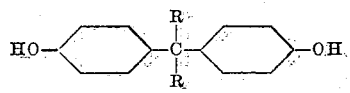

where R is H or alkyl, etc. Other oxyalkylated aromatic phenolic compounds can also be employed.

In general, the process of this invention is carried out by treating imprinted paper, which has preferably been sorted, dusted and macerated, with an aqueous solution containing a minor amount of an oxyalkylated phenol. In practice, the waste paper to be treated is preferably subdivided in relatively small pieces as by passing the waste paper through a conventional shredding machine. The exact size of the pieces is not material, it being advisable merely to so subdivide the waste paper as to avoid the presence of a thick bulky mass which might damage the beater in which the waste paper is subsequently treated and to expose the inked paper to intimate contact with the aqueous solution.

After the paper has been shredded, it is introduced into the aqueous solution in an operating beating engine in sufficient quantity to provide a suspension which the beater can satisfactorily handle. In practice, we employ a suspension of approximately from about one to ten percent by weight, or higher, solid content, but preferably about two to five percent, with an optimum of about 2.5 to 4 percent.

The mass in the beater is circulated around the beater and subjected to the action of the beater wheel until "shiners" have practically disappeared from the mass. The time required for this operation will vary with the particular apparatus employed. Further beating promotes an excess of fine fibers which may not be desirable in preparing paper. Beating time varies with the particular system and apparatus employed, but ordinarily in the laboratory the beating of the mass is continued from about one-half to three minutes, or longer, for example about one to two minutes with an optimum of about one to one and one-half minutes, or until the fiber is completely freed of ink and other extraneous material present. However, these times will vary in the plant, depending on the effectiveness of the apparatus employed.

After completion of the beating action the mass is withdrawn from the beater and the excess liquid is separated from the fiber content which is then washed, if desired. The separation and working of the fibers may, for example, be advantageously accomplished by passing the mass from the beater directly to a continuous filter of the Oliver type. In this type of filter a perforated drum rotates in a tank containing the suspension and by the action of reduced pressure or suction the liquid is drawn through the perforations leaving a mat of fiber on the surface of the drum, through which subsequent filtering takes place. During the rotation of the drum the mat of fiber on the surface thereof can be subjected to sprays of water or the aqueous solution of the deinking compound. Heat as well as reduced pressure can also be used to remove water. Other types of apparatus can also be employed.

After separation and washing, the fiber is conveyed to a storage chest for use in the manufacture of paper or it is suspended in water and passed over a drum or screen to form laps or sheets of pulp. While the foregoing process results in the production of white pulp, if desired in some instances one may subject the recovered fiber to a bleaching operation in which case it is advantageous to pass the fiber from the continuous filter to a chest where the fiber is subjected to the action of a bleaching agent, for example 1% chlorine bleach, after which the bleached fiber is thoroughly washed with water. This washing may also be advantageously conducted by the use of a continuous filter of the Oliver type although other conventional means may be employed.

The process can also be carried out continuously such as by removing the ink from the aqueous medium, by any suitable means, for example, by filtration, settling and decantation, flotation, etc., and combinations thereof and thereupon reusing the aqueous deinking medium to deink additional paper. In other words, the aqueous deinking medium is separated from the paper pulp, freed of ink or other undesirable matter, and reused to treat additional waste paper. The reuse of the deinking medium can be carried out batchwise or continuously.

For economical reasons, we prefer to carry out the process at about room temperature. In addition, by maintaining the temperature close to room temperature better color is obtained in the product. Although the process can be carried out at temperatures lower or higher than room temperature such as from 0°–50° C. or higher, if desired, for reasons of economics and color, we prefer to carry out the process at around room temperature and with temperature preferably ranging no higher than around 50° C.

The deinking agents are evaluated by preparing aqueous solutions of the deinking compound to be tested in concentrations of 1.7, 0.33, and 0.033% by volume. To 300 ml. of each of these solutions is added 10 grams of dry, chopped newsprint. Pulping is effected in a Waring Blendor. The pulp formed is then filtered through a screen. This sheet thus formed is then repulped in about 300 ml. water and filtered through a Buchner funnel where it is drained by suction. This sheet is then tested for G.E. brightness. The G.E. brightness of pulped paper without deinking agent is about 38.5 and its pulped edges about 53.5. The results are presented in the following table:

TABLE I

CYCLOHEXYL PHENOL

| Ex. | Moles EtO per mol. phenol | Percent EtO | G.E. brightness readings at— | | |
|---|---|---|---|---|---|
| | | | 1.7% | 0.333% | 0.033% |
| 1 | 7.2 | 64.3 | | | 43.2 |
| 2 | 7.6 | 65.6 | | | 43.4 |
| 3 | 8.0 | 66.6 | | | 44.4 |
| 4 | 8.4 | 67.7 | | | 45.6 |
| 5 | 8.8 | 68.8 | | | 43.02 |

OCTYL PHENOL

| 6 | 5.15 | 52.5 | | | 41.6 |
| 7 | 5.28 | 53.0 | | | 42.3 |
| 8 | 5.63 | 54.6 | | | 42.8 |
| 9 | 6.04 | 56.3 | | | 41.1 |
| 10 | 9.37 | 66.7 | | | 46.1 |
| 11 | 9.5 | 67.0 | | | 46.3 |
| 12 | 12.5 | 72.8 | | 47.7 | 45.6 |
| 13 | 16.0 | 77.4 | | 47.1 | 46.0 |
| 14 | 20.0 | 81.0 | | 47.6 | 46.2 |
| 15 | 30 | 86.5 | | 46.5 | 44.4 |

DIOCTYL PHENOL

| 16 | 2.89 | 28.6 | | | 37.3 |
| 17 | 3.62 | 33.4 | | | 38.5 |
| 18 | 4.34 | 37.5 | | | 39.7 |
| 19 | 5.06 | 41.2 | | | 40.1 |
| 20 | 5.78 | 44.5 | | | 42.7 |
| 21 | 6.4 | 47.0 | | | 44.3 |
| 22 | 7.23 | 50.0 | | | 43.6 |
| 23 | 8.46 | 54.0 | | | 45.4 |

NONYL PHENOL

| 24 | 1.3 | 20.6 | 42.1 | | |
| 25 | 2.0 | 28.6 | | | 41.6 |
| 26 | 3.0 | 37.5 | | | 38.6 |
| 27 | 3.77 | 43.0 | | 47.8 | |
| 28 | 4.0 | 45.1 | | | 42.05 |
| 29 | 5.0 | 50.0 | | | 40.6 |
| 30 | 5.64 | 53.0 | 46.9 | 48.0 | 43.0 |
| 31 | 6.0 | 54.5 | | | 40.9 |
| 32 | 7.0 | 58.3 | | | |
| 33 | 8.52 | 63.0 | 49.2 | 48.3 | 47.4 |
| 34 | 10.0 | 66.6 | | | 42.2 |
| 35 | 11.0 | 68.8 | | | 45.07 |
| 36 | 12.2 | 71.0 | 49.6 | 47.4 | 47.7 |
| 37 | 13.5 | 73.0 | 49.0 | 46.4 | 48.2 |
| 38 | 23.3 | 85.0 | 49.5 | 48.3 | 46.9 |
| 39 | 30.0 | 85.6 | | | 45.4 |
| 40 | 35.0 | 87.5 | | | 48.3 |
| 41 | 36.6 | 88.0 | 47.0 | 48.1 | 48.7 |
| 42 | 40.0 | 89.9 | | | 46.9 |
| 43 | 45.0 | 90.0 | | | 46.02 |
| 44 | 50.0 | 91.0 | | | 46.6 |
| 45 | 55.2 | 91.7 | | | 46.6 |
| 46 | 60.0 | 92.3 | | | 46.9 |
| 47 | 65.0 | 92.9 | | | 46.8 |
| 48 | 70.0 | 93.4 | | | 46.8 |
| 49 | 75.0 | 93.7 | | | 45.6 |
| 50 | 161.5 | 97.0 | 47.7 | 46.6 | 47.2 |
| 51 | 450.0 | 99.0 | 46.9 | 46.8 | |

TABLE I—Continued

DINONYL PHENOL

| Ex. | Moles EtO per mol. phenol | Percent EtO | G.E. brightness readings at— | | |
|---|---|---|---|---|---|
| | | | 1.7% | 0.333% | 0.033% |
| 52 | 2.0 | 20.6 | | | 38.8 |
| 53 | 4.0 | 33.7 | | | 38.8 |
| 54 | 4.72 | 37.5 | | | 43.7 |
| 55 | 6.0 | 43.3 | | | 39.9 |
| 56 | 7.86 | 50.0 | | | 39.7 |
| 57 | 8.0 | 50.4 | | | 40.6 |
| 58 | 8.6 | 52.2 | | | 41.8 |
| 59 | 9.4 | 54.5 | | | 42.3 |
| 60 | 9.98 | 55.9 | | | 43.3 |
| 61 | 10.0 | 56.0 | | | 43.0 |
| 62 | 10.3 | 56.7 | | | 44.0 |
| 63 | 10.8 | 57.9 | | | 43.5 |
| 64 | 11.5 | 59.4 | | | 44.1 |
| 65 | 12.0 | 60.5 | | | 45.9 |
| 66 | 12.3 | 61.0 | | | 45.7 |
| 67 | 13.7 | 63.5 | | | 45.1 |
| 68 | 14.0 | 64.0 | | | 47.0 |
| 69 | 15.5 | 66.4 | | | 46.1 |
| 70 | 16.0 | 67.0 | | | 46.6 |
| 71 | 17.5 | 69.0 | | | 46.3 |
| 72 | 17.9 | 69.4 | | | 47.4 |
| 73 | 18.0 | 69.6 | | | 47.4 |
| 74 | 19.1 | 70.8 | | | 45.2 |
| 75 | 20.0 | 71.7 | | | 44.7 |
| 76 | 20.7 | 72.5 | | | 44.5 |
| 77 | 21.6 | 73.4 | | | 47.6 |
| 78 | 21.9 | 73.6 | | | 48.3 |
| 79 | 22.3 | 74.0 | | | 45.7 |
| 80 | 23.9 | 75.4 | | | 45.9 |
| 81 | 25.0 | 76.1 | | | 44.5 |
| 82 | 30.0 | 79.2 | | | 47.6 |
| 83 | 31.4 | 80.0 | | | 46.9 |
| 84 | 35.0 | 81.6 | | | 48.0 |
| 85 | 39.3 | 83.6 | | | 47.2 |
| 86 | 41.6 | 84.1 | | | 46.8 |
| 87 | 45.0 | 85.0 | | | 46.1 |
| 88 | 50.0 | 86.4 | | | 46.4 |
| 89 | 55.6 | 87.6 | | | 47.9 |
| 90 | 60.2 | 88.5 | | | 46.5 |
| 91 | 65.0 | 89.0 | | | 48.5 |
| 92 | 70.0 | 89.9 | | | 48.5 |
| 93 | 75.0 | 90.4 | | | 47.9 |

DODECYL PHENOL

| 94 | 1.0 | 16.8 | | | 38.6 |
|---|---|---|---|---|---|
| 95 | 2.0 | 25.2 | | | 38.4 |
| 96 | 15.7 | 72.5 | | | 48.3 |
| 97 | 20.0 | 83.4 | | | 49.3 |
| 98 | 35.0 | 85.6 | | | 49.0 |
| 99 | 40.7 | 87.4 | | | 48.1 |
| 100 | 45.0 | 88.3 | | | 48.9 |
| 101 | 50.0 | 89.4 | | | 47.4 |
| 102 | 55.0 | 90.2 | | | 48.4 |
| 103 | 60.0 | 90.7 | | | 48.1 |
| 104 | 65.0 | 91.5 | | | 48.1 |
| 105 | 70.0 | 92.1 | | | 47.8 |

DIDODECYL PHENOL

| 106 | 6.0 | 38.0 | | | 38.5 |
|---|---|---|---|---|---|
| 107 | 12.0 | 55.3 | | | 43.0 |
| 108 | 14.0 | 59.0 | | | 43.8 |
| 109 | 16.0 | 62.1 | | | 45.0 |
| 110 | 18.0 | 64.7 | | | 45.9 |
| 111 | 20.0 | 67.2 | | | 43.3 |
| 112 | 22.9 | 70.0 | | | 47.3 |
| 113 | 25.0 | 71.4 | | | 44.8 |
| 114 | 30.1 | 76.9 | | | 46.3 |
| 115 | 35.0 | 78.1 | | | 45.8 |
| 116 | 40.1 | 80.5 | | | 44.4 |
| 117 | 44.9 | 82.0 | | | 43.2 |
| 118 | 50.0 | 83.6 | | | 45.0 |
| 119 | 55.1 | 85.2 | | | 43.6 |
| 120 | 60.3 | 86.1 | | | 43.7 |
| 121 | 65.1 | 87.1 | | | 44.4 |
| 122 | 70.0 | 87.6 | | | 45.9 |

In the following examples nonyl phenol was first reacted with ethylene oxide to yield a product containing the number of moles shown in the table.

Part of this product was removed from the reaction mixture and the remainder was then reacted with propylene oxide to the extent shown in the table. Both the oxyethylated nonyl phenol (A) and the oxyethylated, oxypropylated nonyl phenol (B) were then tested for their deinking properties according to the above process employing filtration in a concentration of 0.033%. The brightness of the treated paper deinked with the respective compounds is shown in the following table:

TABLE II

OXYALKYLATED NONYL PHENOL

| A | | | | B | | | |
|---|---|---|---|---|---|---|---|
| Ex. | EtO moles | Percent EtO | Brightness | Ex. | Moles PrO added after oxyethylation | Percent EtO | Percent PrO | Brightness |
| 1 | 11.0 | 68.8 | 45.07 | 1a | 0 | | | 47.0 |
| 2 | 30.0 | 85.6 | 45.4 | 2a | 3.0 | 77.0 | 10.1 | 48.0 |
| 3 | 30.0 | 85.6 | 45.4 | 3a | 6.0 | 70.0 | 18.3 | 48.0 |
| 4 | 30.0 | 85.6 | 45.4 | 4a | 9.0 | 64.0 | 25.3 | 45.8 |
| 5 | 30.0 | 85.6 | 45.4 | 5a | 12.0 | 59.1 | 31.2 | 46.5 |
| 6 | 35.0 | 87.5 | 48.3 | 6a | 3.0 | 79.6 | 9.0 | 45.4 |
| 7 | 35.0 | 87.5 | 48.3 | 7a | 6.0 | 73.0 | 16.4 | 45.9 |
| 8 | 35.0 | 87.5 | 48.3 | 8a | 9.0 | 67.4 | 22.8 | 45.2 |
| 9 | 35.0 | 87.5 | 48.3 | 9a | 12.0 | 62.7 | 28.4 | 47.1 |
| 10 | 40.0 | 89.0 | 46.9 | 10a | 3.0 | 81.7 | 8.0 | 46.4 |
| 11 | 40.0 | 89.0 | 46.9 | 11a | 6.0 | 75.5 | 14.9 | 47.9 |
| 12 | 40.0 | 89.0 | 46.9 | 12a | 9.0 | 70.3 | 20.8 | 48.0 |
| 13 | 40.0 | 89.0 | 46.9 | 13a | 12.0 | 65.9 | 26.0 | 46.4 |
| 14 | 45.0 | 90.0 | 46.02 | 14a | 3.0 | 83.4 | 7.3 | 47.7 |
| 15 | 45.0 | 90.0 | 46.02 | 15a | 6.0 | 77.6 | 13.6 | 47.4 |
| 16 | 45.0 | 90.0 | 45.02 | 16a | 9.0 | 72.6 | 19.1 | 45.7 |
| 17 | 45.0 | 90.0 | 45.02 | 17a | 12.0 | 68.5 | 24.0 | 46.8 |
| 18 | 50.0 | 91.0 | 46.6 | 18a | 3.0 | 85.0 | 6.7 | 46.3 |
| 19 | 50.0 | 91.0 | 46.6 | 19a | 6.0 | 79.5 | 12.5 | 46.9 |
| 20 | 50.0 | 91.0 | 46.6 | 20a | 13.0 | 69.3 | 23.8 | 46.0 |
| 21 | 50.0 | 91.0 | 46.6 | 21a | 20.0 | 61.4 | 32.4 | 45.0 |
| 22 | 55.2 | 91.7 | 46.6 | 22a | 10.0 | 75.1 | 17.9 | 45.3 |
| 23 | 55.2 | 91.7 | 46.6 | 23a | 20.0 | 63.7 | 30.5 | 45.8 |
| 24 | 55.2 | 91.7 | 46.6 | 24a | 30.0 | 55.3 | 39.7 | 46.2 |
| 25 | 55.2 | 92.7 | 46.6 | 25a | 40.0 | 48.9 | 46.7 | 45.6 |
| 26 | 60.0 | 92.3 | 46.9 | 26a | 10.0 | 76.6 | 16.8 | 46.2 |
| 27 | 60.0 | 92.3 | 46.9 | 27a | 20.0 | 65.6 | 28.8 | 47.2 |
| 28 | 60.0 | 92.3 | 46.9 | 28a | 30.0 | 57.4 | 37.8 | 44.2 |
| 29 | 60.0 | 92.3 | 46.9 | 29a | 40.0 | 51.0 | 44.8 | 45.5 |
| 30 | 65.0 | 92.9 | 46.8 | 30a | 10.0 | 78.1 | 15.8 | 46.8 |
| 31 | 65.0 | 92.9 | 46.8 | 31a | 20.0 | 67.4 | 27.4 | 46.1 |
| 32 | 65.0 | 92.9 | 46.8 | 32a | 30.0 | 59.4 | 36.1 | 46.7 |
| 33 | 65.0 | 92.9 | 46.8 | 33a | 40.0 | 52.9 | 43.0 | 46.6 |
| 34 | 70.0 | 93.4 | 46.8 | 34a | 15.0 | 74.0 | 20.8 | 46.2 |
| 35 | 70.0 | 93.4 | 46.8 | 35a | 25.0 | 64.9 | 30.5 | 45.0 |
| 36 | 70.0 | 93.4 | 46.8 | 36a | 35.0 | 57.8 | 38.2 | 44.8 |
| 37 | 70.0 | 93.4 | 46.8 | 37a | 50.0 | 49.7 | 46.8 | 43.8 |
| 38 | 75.0 | 93.7 | 45.6 | 38a | 10.0 | 80.5 | 14.1 | 46.0 |
| 39 | 75.0 | 93.7 | 45.6 | 39a | 20.0 | 70.5 | 24.6 | 45.0 |
| 40 | 75.0 | 93.7 | 45.6 | 40a | 30.0 | 62.7 | 33.1 | 46.0 |
| 41 | 75.0 | 93.7 | 45.6 | 41a | 40.0 | 56.5 | 39.8 | 47.0 |

In the above Tables I and II, it is to be noted that filtration was employed. Where flotation is employed in place of filtration employing the same compound, an increased G.E. brightness of 4–7 points is obtained over the filtration process. In addition, less deinking agent is as effective, or more effective, in a flotation process as compared to the filtration process.

Thus, in the preferred embodiment the ink is removed from the system by means of flotation. Ink particles in this system are susceptible of froth flotation in a conventional apparatus, the specific technique to be employed with a given pulp for maximum separation of the ink particles varying somewhat with the nature of the pulp. With certain pulps, it is possible to float the ink away from the fiber without the addition of flotation agents. To some extent it is desirable to use a frothing agent. With other pulps it may be desirable to use a flotation agent. After the ink particles have been floated away in the froth from the flotation cell, the cleaned pulp is removed, dewatered and washed and used in the manner described above.

Examples of suitable flotation apparatus which can be employed in deinking can be found in U.S. Patent 2,005,742.

The following examples illustrate the use of the flotation in conjunction with this process.

The following examples were carried out by pulping 20 grams of cut newsprint in 600 ml. of aqueous deinking agent by means of a Waring Blendor. As a floatation aid, the following agents were added to the pulp: 0.1 gram sodium sulfide as a 1% solution, two drops of pine oil and four drops of turpentine. The pulped product was then placed in a flotation cell in which air was bubbled from an inlet in the bottom. After a flotation time of about five minutes, the surface froth was skimmed off and the pulp then filtered through a Buchner funnel to form a sheet. Where recycling of solvent was employed, a "make up" of about 15% aqueous deinking agent of the same concentration was employed (i.e. 90 ml. additional). The results are present in the following table:

TABLE III

*Flotation Deinking*

| Ex. | Deinking agent | | Method employed | G.E. brightness |
|---|---|---|---|---|
| | Name | Concentration | | |
| 1 | None | | Newsprint pulped in water without chemical aid or flotation. Filtration employed. | 38.4 |
| 2 | ----do---- | | White edges of newsprint pulped in water without chemical aid or flotation. Filtration employed. | 53.5 |
| 3 | Dinonyl phenol plus 40 moles EtO. | 0.1 | Flotation | 51.9 |
| 4 | ----do---- | 0.01 | ----do---- | 50.7 |
| 5 | ----do---- | 0.001 | ----do---- | 47.3 |
| 6 | ----do---- | 0.06 | ----do---- | 49.8 |
| 7 | ----do---- | 0.06 | Recycle 1st | 49.8 |
| 8 | ----do---- | 0.06 | Recycle 2nd | 51.4 |
| 9 | ----do---- | 0.06 | Recycle 3rd | 50.1 |
| 10 | ----do---- | 0.06 | Recycle 4th | 49.8 |
| 11 | ----do---- | 0.06 | Recycle 5th | 49.8 |
| 12 | ----do---- | 0.06 | Recycle 6th | 49.8 |
| 13 | ----do---- | 0.06 | Recycle 7th | 49.8 |
| 14 | ----do---- | 0.06 | Recycle 8th | 49.8 |

NOTE.—Examples 3 through 14 above relate to newsprint.

Although newsprint has been used to illustrate our process, any imprinted cellulosic material can be salvaged for reuse by the process of the present invention, for example various kinds of imprinted paper, such as imprinted newsprint, rotogravure newsprint, bookstock, magazine stock, ledger stock, cardboard, etc. The term, "paper products" as employed in the specification and claims, includes all of such products.

In addition, it should be realized that the above deinking agents are merely exemplary of a wide variety of oxyalkylated phenols which can be employed to yield a clean pulp.

Deinked paper is a very important source of raw material for the manufacture of book and magazine papers, labels, coated papers, etc. Waste ledger papers, bonds, etc., can be deinked making possible the reduction in the amount of virgin pulp required in such grades as patent coated boards, Bristols, envelope papers, etc., as well as in book, magazine, and cover papers. Deinked groundwood papers can be used advantageously as subliners in patent-coated, multicylinder boards and as a substantial portion of the liner furnish in manila-lined boards. They are also being used in considerable quantity for the manufacture of hangings, newsprint, poster paper, mimeograph paper, catalog papers, tissues, and similar papers in which groundwood is ordinarily used. Other uses of deinked paper are well known to the art.

Having thus described our invention what we claim as new and desire to obtain by Letters Patent is:

1. A process of deinking paper products characterized by pulping imprinted paper with a caustic-free aqueous solution consisting essentially of a minor amount of an oxyalkylated phenolic compound in water, removing the ink particles from the aqueous solution, and thereupon separating the paper pulp from the aqueous solution.

2. The process of claim 1 wherein the oxyalkylated phenol contains at least 40% alkylene oxide.

3. The process of claim 2 wherein the oxyalkylated phenol contains at least 50% alkylene oxide.

4. The process of claim 3 wherein the oxyalkylated phenol contains at least 70% alkylene oxide.

References Cited in the file of this patent

UNITED STATES PATENTS

| | | |
|---|---|---|
| 1,925,372 | Darling | Sept. 5, 1933 |
| 1,988,363 | Snyder | Jan. 15, 1935 |
| 2,005,742 | Hines | June 25, 1935 |
| 2,753,309 | Figdor | July 3, 1956 |

OTHER REFERENCES

Ellis: Printing Inks, pub. by Reinhold Pub., 1940, pp. 480–483.